United States Patent [19]

Dunaway

[11] 3,997,232
[45] Dec. 14, 1976

[54] SUBMERSIBLE ELECTRIC MOTOR AND ELECTRICAL CONNECTOR ASSEMBLY

[75] Inventor: Louis R. Dunaway, Gettysburg, Ohio

[73] Assignee: Century Electric Motor Co., Gettysburg, Ohio

[22] Filed: May 19, 1975

[21] Appl. No.: 578,532

[52] U.S. Cl. .......................... 339/94 R; 339/268 R
[51] Int. Cl.² ............................................ H01R 13/52
[58] Field of Search ............... 339/60, 94, 103, 268

[56] References Cited

UNITED STATES PATENTS

| | | | |
|---|---|---|---|
| 2,142,176 | 1/1939 | Cameron | 339/94 R |
| 2,605,315 | 7/1952 | Hargett | 339/94 M |
| 2,700,140 | 1/1955 | Phillips | 339/94 M |
| 2,742,622 | 4/1956 | Stevens, Jr. | 339/94 R |
| 2,933,712 | 4/1960 | Klopfenstein | 339/94 M |
| 3,092,431 | 6/1963 | Bilbrey | 339/94 A |
| 3,266,009 | 8/1966 | Jensen et al. | 339/94 M |
| 3,384,860 | 5/1968 | Schaefer et al. | 339/94 R |
| 3,406,371 | 10/1968 | Buckcridge | 339/94 M |
| 3,501,737 | 3/1970 | Harris et al. | 339/103 R |
| 3,550,065 | 12/1970 | Phillips | 339/94 M |

FOREIGN PATENTS OR APPLICATIONS

| | | | |
|---|---|---|---|
| 767,307 | 1/1957 | United Kingdom | 339/94 M |
| 1,067,664 | 5/1967 | United Kingdom | 174/112 |

Primary Examiner—Joseph H. McGlynn
Attorney, Agent, or Firm—Jacox & Meckstroth

[57] ABSTRACT

A plurality of separate electrical power supply lead wires each have an exposed end portion projecting from a surrounding insulation. The end portions are slidably received within corresponding collett-like socket members supported by an insulator plug disposed within a bore formed within a submersible electrical motor housing. A strain relief washer engages the socket members and supports a resilient gland member which has corresponding bores for slidably receiving the insulation on the lead wires. A bushing and tubular nut surround the lead wires and project into the upper end of the bore to provide for compressing the gland member axially within the bore for producing a fluid-tight seal between the insulation on each lead wire and the housing and to press the strain relief washer against the socket members for gripping the lead wires. The socket members project through corresponding holes within a lightning arrestor electrode which defines an annular gap surrounding each socket member, and a corresponding plurality of threaded coupling elements connect the stator lead wires to the socket members and form part of a sub-assembly. The coupling elements are also sealed to the motor housing by compressing a resilient gland member axially within the lower end portion of the bore with another insulator bushing and tubular nut which surround the stator lead wires.

14 Claims, 6 Drawing Figures

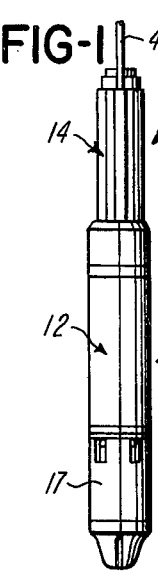
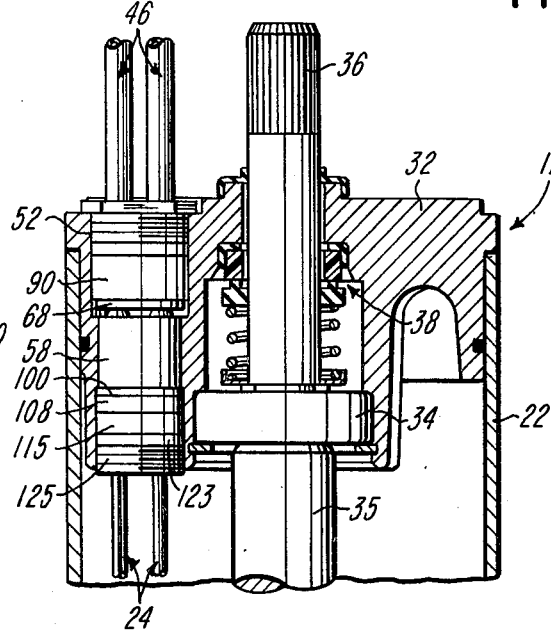
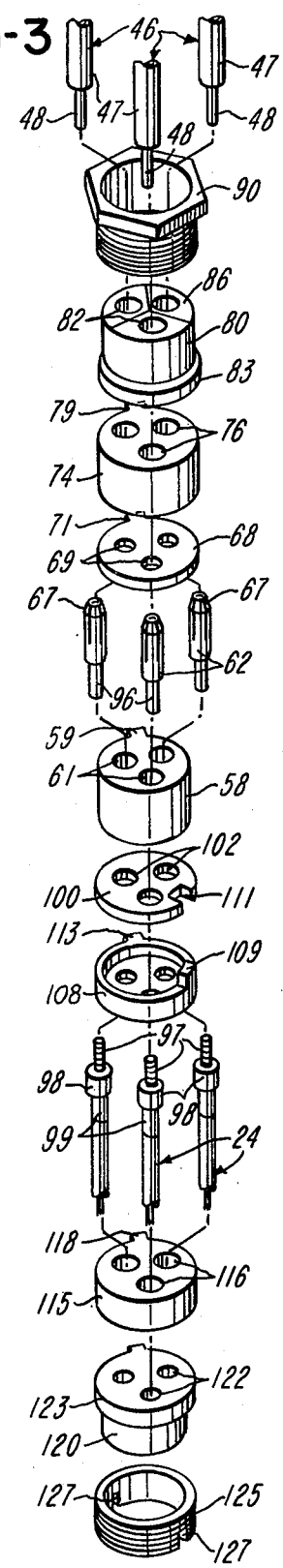
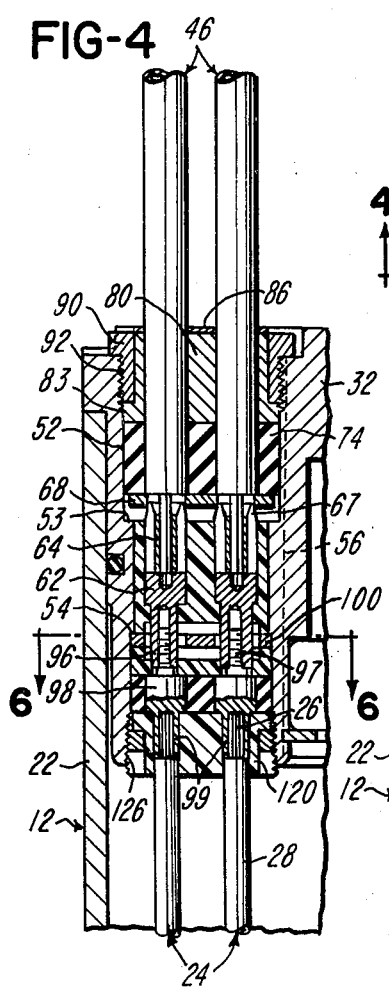
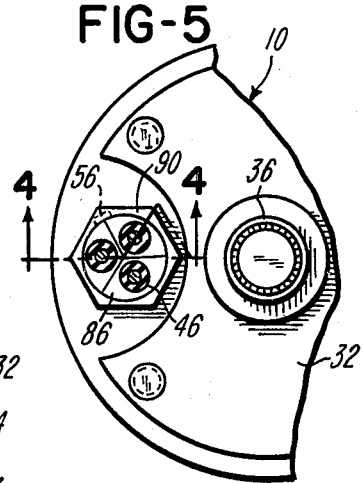
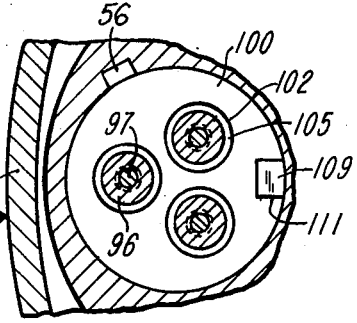

SUBMERSIBLE ELECTRIC MOTOR AND ELECTRICAL CONNECTOR ASSEMBLY

BACKGROUND OF THE INVENTION

In the art of submersible electrical motors, for example, of the type used in combination with a deep well water pump such as disclosed in U.S. Pat. No. 3,250,927, it is common for the motor to be submerged within the well water at a substantial depth. Electrical lead wires, commonly referred to as a "drop cable" extend from an external power source downwardly through the well casing to the electric motor. The motor may be provided with a power supply cord of predetermined length, and the drop cable is connected to the power supply cord by means of a splice or a molded-on cable connector, for example, of the type disclosed in U.S. Pat. No. 2,958,842. It is also common to provide the drop cable with a plug-type connector which is molded onto the lower end of the drop cable and plugs into a mating socket member supported within the submersible motor housing. For example, U.S. Pat. Nos. 3,059,210, 3,248,582, 3,294,993, 3,308,316, 3,350,587 and 3,777,194 disclose various forms of electrical plug-type connectors for a submersible electric motor.

It has been found highly desirable to eliminate the need for forming a splice or attaching an electrical plug-type connector to the lower end of electrical power supply lead wires or a drop cable and to eliminate the need for forming a positive liquid-tight seal at the splice or between the plug connector and the lead wires by means of injection molding the plug connector around the lead wires. By eliminating the plug connector, it is necessary for the motor and/or motor-pump manufacturer to supply a drop cable having a molded-on electrical plug member which mates with the socket member within the motor. Furthermore, the elimination of the plug-type connector eliminates the need for producing and supplying drop cables of various lengths corresponding to the depth of the motor-pump unit below the ground surface.

In view of the fact that electric motors submerged within a current conducting liquid such as well water are subjected to electrical grounding, it is desirable to protect the motor from a power or voltage surge, for example, as caused by lightning hitting the electrical power supply lines or drop cable. One form of lightning arrestor for a submersible electrical motor, is disclosed in U.S. Pat. No. 3,849,704. This arrestor incorporates an electrode within a gas generating, arc extinguishing material contained within a closed casing retained within the motor housing.

SUMMARY OF THE INVENTION

The present invention is directed to an improved electrical connector assembly for a submersible electric motor and which provides the desirable feature mentioned above. That is, the electrical connector assembly of the invention provides for a direct connection of commercially available power supply lead wires to the electric motor without any form of plug connector or splicing system and in a manner which provides for a direct water-tight seal between the insulation on the lead wires and the motor housing. The electrical connector assembly also provides for a positive strain relief for the lead wires and for a simplified lighting arrestor which protects the motor from a voltage surge within any of the lead wires connected to the motor so that any voltage surge is discharged directly to the motor housing ahead of all circuitry which requires protection from voltage surges.

In accordance with one embodiment of the invention, the above features are provided within a submersible electrical motor by supporting a plurality of individual electrical conducting collett-like socket members with an insulator plug which is disposed within a bore formed in the submersible motor housing. The socket members have openings for slidably receiving the exposed end portions of the power supply lead wires, and a strain relief washer cams the socket members into gripping engagement with the end portions. A resilient gland member is positioned within the bore and has a corresponding plurality of openings for slidably receiving the insulation on lead wires, and the gland member is compressed axially within the bore by a mating bushing and tubular nut which is threaded into the upper end portion of the bore.

The socket members project axially through corresponding circular openings formed within a lightning arrestor electrode which is positively positioned and retained by another insulator element and a corresponding plurality of electrical coupling elements threaded into the socket members to form a sub-assembly. The coupling elements are sealed to the motor housing by another surrounding resilient gland member which is compressed axially within the lower end portion of the bore by a surrounding insulator bushing and tubular nut threaded into the lower end portion of the bore. This sealed assembly also permits replacement of any or all motor leads without opening the sealed motor.

Other features and advantages of the invention will be apparent from the following description, the accompanying drawing and the appended claims.

BRIEF DESCRIPTION OF THE DRAWING

FIG. 1 is an elevational view of a submersible electric motor-pump unit incorporating an improved electrical connector assembly in accordance with the invention;

FIG. 2 is an enlarged axial section of the upper end portion of the electric motor showing the electrical connector assembly in elevation;

FIG. 3 is an exploded perspective view of the electrical connector assembly shown in FIG. 2;

FIG. 4 is an enlarged axial section of the connector assembly shown in FIGS. 2 and 3 and taken generally on the line 4—4 of FIG. 5;

FIG. 5 is a fragmentary plan view of the submersible motor and connector assembly shown in FIG. 2; and FIG. 6 is an enlarged fragmentary section taken generally on the line 6—6 of FIG. 4.

DESCRIPTION OF THE PREFERRED EMBODIMENT

Referring to the drawing, FIG. 1 illustrates a typical deep well submersible motor-pump unit which includes an electric motor 10 having a cylindrical motor housing 12 coupled to a cylindrical housing 14 of a multiple stage centrifugal pump unit 15. The electric motor 10 may be of the oil-filled type, for example, as disclosed in above mentioned U.S. Pat. No. 3,250,927, wherein the lower end of the motor housing 12 is connected with an extension housing 17 for enclosing a starting capacitor as shown in the patent. The electric motor 10 may also be constructed without a starting capacitor and housing 17, and may be of the non-oil-filled type, for example, as disclosed in above U.S. Pat. Nos. 3,777,194 and No. 3,849,704.

For purpose of illustration, the housing 12 of the submersible electric motor 10 includes a cylindrical shell 22 enclosing a stator (not shown) having coil lead wires 24 which may extend directly from the coils or connect the coils through a starting switch and/or capacitor such as shown in above U.S. Pat. No. 3,250,927. Each of the stator lead wires 24 includes an electrical conductor having an end portion 26 projecting from the end of surrounding electrical insulation 28 having a cylindrical outer surface. The motor housing 12 also includes a motor end bracket 32 which projects into the cylindrical shell 22 and retains an anti-friction bearing 34 for rotatably supporting a rotor having a shaft 35. The rotor shaft 35 preferably includes a splined upper end portion 36 which is coupled to the shaft of the pump unit 15, and a rotary seal assembly 38 forms a fluid-tight seal between the rotor shaft 35 and the end bracket 32.

In accordance with the present invention, electrical power is supplied to the motor 10 through a drop cable 45 which includes a plurality of two or three lead wires 46 each including a layer of insulation 47 having a cylindrical outer surface and surrounding a copper electrical conductor having an exposed lower end portion 48. Referring to FIGS. 2–4, a stepped cylindrical opening or bore 52 is formed within the bearing retaining bracket 32 and is provided with an upwardly annular shoulder 53 and a downwardly facing annular shoulder 54. The bore 52 is also provided with an axially extending keyway 56 (FIG. 5).

A rigid plug 58 of molded plastics electrical insulation material is positioned within the bore 52 between the shoulders 53 and 54 and includes an outwardly projecting integral rib or key which projects into the keyway 56. The plug 58 includes a plurality of axially extending stepped cylindrical openings or holes 61 which receive a corresponding plurality of brass socket members 62 each of which has a split collett-like upper end portion defining a bore which receives a corresponding split sleeve 64. The sleeves 64 are preferably formed from a phosphorous bronze cooper alloy having a spring temper and are sized so that they slidably receive the exposed corresponding end portions 48 of the lead wires 46. The sleeves 64 are interchangeable and-/or removable according to the diameter of the end portions 48 of the lead wires 46.

Each of the socket members 62 has a tapered upper end portion 67, and a flat strain relief member or washer 68 has a corresponding plurality of circular openings or holes 69 for receiving the upper end portions 67 of the socket members 62. The washer 68 is molded of a rigid plastics electrical insulation material such as nylon and includes an integral key portion 71 (FIG. 3) which also projects outwardly into the keyway 56.

A resilient cylindrical gland member 74 is formed of a rubber-like material and includes a corresponding plurality of axially extending openings or bores 76 which slidably receive the insulation 47 of the lead wires 46. The gland member 74 seats on top of the strain relief washer 68 and includes an integral key 79 (FIG. 3) which projects into the keyway 56.

A rigid gland retaining bushing 80 and seats on the gland member 74 and has a corresponding plurality of holes or bores 82 which align with the bores 76 and also slidably receive the insulation 47 from the corresponding lead wires 46. The bushing 80 is preferably molded of a rigid plastics material and includes an outwardly projecting lower flange portion 83, with an integral key (not shown) projecting into the keyway 56. A circular pressure sensitive decal 86 (FIGS. 4 and 5) is attached to the upper surface of the bushing 80 and is color-coded with arcuate segments of yellow, red and black to identify the proper orientation of the lead wires 46.

A tubular nut 90 has a lower portion which engages internal threads formed in the upper end portion of the bore 52 and also engages the outwardly projecting flange portion 83 of the bushing 80. After the insulation 47 is removed from the lower exposed end portions 48 of the lead wires 46 and with the nut 90 released, the lead wires 46 are inserted into the corresponding aligned bores 76 and 82 so that the exposed end portions 48 of the lead wires 46 slide into the upper end portions of the socket members 62. When the nut 90 is tightened, the resilient gland member 74 is compressed axially by the bushing 80 so that the gland member rigidly grips the insulation 47 on each lead wire 46 and also presses firmly against the inner surface of the bore 52 and keyway 56 to form a liquid-tight seal between the lead wires 46 and the motor end bracket 32.

The axial compression force exerted on the gland member 74 by the bushing 80 and nut 90 is also effective to press the strain relief washer 68 downwardly so that the upper end portions of the socket member 62 are cammed inwardly and firmly grip the lower exposed end portions 48 of the lead wires 46. This gripping or clamping of the lower end portions 48 provides an effective electrical connection and strain relief for the lead wires 46 and cooperates with the gripping of the lead wires by the gland member 74 to insure that the lead wires 46 cannot be pulled outwardly from within the bore 52 in the motor end bracket 32.

Referring to FIGS. 3 and 4, the socket members 62 include lower cylindrical end portions 96 each of which has an internally threaded opening or hole for receiving the upper threaded end portion 97 of a corresponding electrical coupling element 98 which is also formed of brass. The coupling elements 98 each have a lower tubular end portion 99 which receives the upper exposed end portion 26 of the electrical conductor of the corresponding coil lead wire 24 or extension thereof. Preferably, the attachment or connection is formed by crimping the tubular end portion 99 of each coupling element 98 against the corresponding conductor end portion 26.

As shown in FIGS. 4 and 6, a circular washer-like grounding electrode 100 seats against the lower inverted cup-shaped end portion of the insulator plug 58 and the internal shoulder 54. The electrode 100 may be formed of a metal or a semiconducting material and has a corresponding plurality of circular openings which receive the lower end portions 96 of the socket members 62. The diameter of the openings 102 is greater than the diameter of the sockets 96 to define an annular gap 105 (FIG. 6) of predetermined radial distance. In the event that the power supply lead wires 46 receives a certain voltage surge, for example, as a result of being exposed to lightning, the electrode 100 provides for discharging the voltage surge across the gaps 105 to ground through the motor housing 12 and the liquid or water surrounding the housing. For example, the gaps 105 may be sized to provide for grounding of the voltage surge 2500 volts.

The electrode 100 also seats on a cup-shaped cylindrical retainer member 108 which is formed of electrically insulating plastics material and includes a tab 109 which projects upwardly into a correspondingly shaped notch 111 formed within the electrode 100 to assure that the electrode is always properly orientated and positioned with respect to the insulator plug member 58 and the socket members 62 and thereby assure that each gap 105 remains precisely uniform in width. As apparent from FIG. 4, the electrode 100 is sandwiched between the plug member 58 and the retainer member 108, and the electrical coupling elements 98 also function to secure the plug member 58, socket members 62, electrode 100 and the retainer member 108 together in the form of a sub-assembly. After this sub-assembly is made, the lead wires 24 are connected to the end portions 99 of the coupling elements 98, and the sub-assembly is inserted into the bore 52. The retainer member 108 also includes an outwardly projecting integral key 113 which projects into the keyway 56 and cooperates with the key 59 to assure proper angular orientation of the sub-assembly within the bore 52.

Another resilient cylindrical gland member 115 is positioned within the lower end portions of the bore 52 and includes corresponding cylindrical bores or openings 116 for slidably receiving the cylindrical center portions of the coupling elements 98. The gland member 115 includes an integrally molded key 118 which projects into the keyway 56 and is retained within the bore 52 by a rigid bushing 120 which is molded of an electrical insulating plastics material in the same manner as the bushing 80. The bushing 120 includes a corresponding plurality of cylindrical bores or openings 122 which slidably receive the lower end portions 99 of the coupling elements 98 having an outer diameter corresponding to the diameter of the insulation 28 from the stator coil lead wires 24 or extensions thereof.

The bushing 120 also includes an outwardly projecting upper flange portion 123 which is engaged by the upper end of a tubular nut 125 threaded into internal threads 126 formed within the lower end portion of the bore 52. The nut 125 has a pair of diametrically opposed slots 127 for receiving a suitable spanner wrench (not shown). When the nut 125 is tightened, the bushing 120 compresses the resilient gland member 115 axially to form a fluid-tight seal between the electrical coupling elements 98 and the end bracket 32 of the motor housing 12 in the same manner as described above in connection with the resilient gland member 74.

From the drawing and the above description, it is apparent that a submersible electric motor incorporating an electrical connector assembly in accordance with the present invention, provides desirable features and advantages. For example, as one important feature which was mentioned above, the connector assembly eliminates the need for molding an electrical connecting plug on the lower end portion of a "drop cable" and thus eliminates the need for supplying preformed drop cables in various lengths. Furthermore, the resilient gland member 74 cooperates with the bushing 80 and the nut 90 to form a positive liquid-tight seal between the individual lead wires 46 and the motor housing 12. In addition, the axial force exerted on the rigid washer 68 by the gland member 74 provides for radially compressing the split upper end portions of the socket members 62 so that the exposed end portions 48 of the lead wires 46 are mechanically gripped to assure a positive clamping action.

An another important feature, the electrode 100 provides for a simplified ligntning arrester which effectively grounds a voltage surge within any or all of the lead wires 46, and this grounding occurs at a location ahead of the stator coils and of all circuitry within the motor which requires protection. As also mentioned above, the particular construction and arrangement of some of the components provide for a sub-assembly which may be conveniently inserted into the lower end portion of the bore 52 during the main assembly of the electric motor.

While the form of electrical connector assembly and method of assembly herein described constitute a preferred embodiment of the invention, it is to be understood that the invention is not limited to this precise form of construction and assembly, and that changes may be made therein without departing from the scope and spirit of the invention as defined in the appended claims.

The invention having thus beed described, the following is claimed:

1. In a submersible electric motor including a housing enclosing a stator and a rotor having a shaft supported by bearing means, an improved electrical connector assembly for coupling to said motor a plurality of individual power supply lead wires each having an exposed end portion projecting from a corresponding surrounding insulation, said connector assembly comprising means defining a bore within said housing, a corresponding plurality of electrically conducting socket members each having means defining an opening for slidably receiving the exposed end portion of the corresponding power supply lead wire, insulator means within said bore for supporting said socket members in generally parallel spaced relation, a resilient gland member disposed within said bore and having means defining a corresponding plurality of openings aligned axially with the corresponding said openings within said socket members, each said opening within said gland member being sized for slidably receiving said insulation on the corresponding said power supply lead wire, means on said housing for compressing said gland member in an axial direction after said exposed end portions of said power supply lead wires are inserted into the corresponding said openings within said socket members to produce a fluid-tight seal between said insulation of each said power supply lead wire and said motor housing, each of said socket members including a split upper end portion, a strain relief member positioned adjacent said socket members and having holes for receiving corresponding said end portions of said socket members, means for camming said upper end portions of said socket members into firm gripping relation with said end portions of said power supply lead wires in response to axial pressure exerted on said strain relief washer when said gland member is compressed, and means for electrically connecting each socket member to a corresponding lead wire within said housing.

2. In a submersible electric motor including a housing enclosing a stator and a rotor having a shaft supported by bearing means, an improved electrical connector assembly for coupling to said motor a plurality of individual power supply lead wires each having an exposed end portion projecting from a corresponding surrounding insulation, said connector assembly comprising means connected to said housing and defining a bore, a corresponding plurality of electrically conducting socket members, insulator means within said bore for supporting said socket members in generally parallel spaced relation, a resilient gland member disposed within said bore and having means defining a corresponding plurality of openings aligned axially with the corresponding said openings within said socket members, each said opening within said gland member being sized for slidably receiving said insulation on the corresponding said power supply lead wire, each of said socket members having means defining an opening for slidably receiving and gripping the exposed end portion of the corresponding said power supply lead wire after said socket member and said gland member are positioned within said bore, means for compressing said gland member in an axial direction after said exposed end portions of said power supply lead wires are slidably inserted into the corresponding said openings within said socket members to produce a fluid-tight seal between said insulation of each said power supply lead wire and said motor housing, and means for electrically connecting each socket member to a corresponding lead wire within said housing.

3. A submersible electric motor and electrical connector assembly as defined in claim 2 wherein said means for electrically connecting each socket member to a corresponding stator lead wire within said housing, includes an electrical connector element connected to the corresponding socket member, a second resilient gland member disposed within said bore and having a plurality of spaced openings for receiving the corresponding said electrical connector elements, an electrical insulating bushing member disposed within said bore and having a corresponding plurality of openings for receiving said electrical connector elements, and a tubular nut threaded into said bore for pressing said bushing member in a direction to compress said gland member in an axial direction to form a fluid-tight seal between each said electrical connector element and said motor housing.

4. A submersible electric motor and electrical connector assembly as defined in claim 2 including key means for properly orienting said insulator means and said gland member with respect to each other and said motor housing.

5. A submersible electric motor and electrical connector assembly as defined in claim 2 wherein said means on said housing for compressing said gland member, comprise a substantially rigid retainer bushing having a corresponding plurality of parallel spaced bores aligned axially with said openings within said gland member, said bushing including an outwardly projecting integral flange portion having an outer diameter generally the same as the diameter of said bore, and a tubular nut member surrounding said bushing adjacent said flange portion and threadably engaging said housing.

6. A submersible electric motor and electrical connector assembly as defined in claim 5 including means on said bushing for identifying each said bore from the other said bores within said bushing to facilitate proper insertion of said power supply lead wires.

7. A submersible electric motor and electrical connector assembly as defined in claim 2 including a lightning arrester electrode disposed within said bore and having a corresponding plurality of openings aligned axially with said socket members, means connected to said socket members and projecting through said openings, each said opening within said electrode having a diameter greater than the diameter of the corresponding said means connected to said socket member to form an annular gap of predetermined size therebetween, and means for retaining said electrode within said bore.

8. A submersible electric motor and electrical connector assembly as defined in claim 7 wherein said means for electrically connecting each socket member to a corresponding lead wire within said housing, include an electrical connector element threadably connected to a corresponding said socket member, and means for rigidly securing said electrode to said insulator means in response to threadably connecting said electrical conductor elements to said socket members.

9. In a submersible electric motor including a housing enclosing a stator and a rotor having a shaft supported by bearing means, an improved electrical connector assembly for coupling to said motor a plurality of individual power supply lead wires each having an exposed end portion projecting from a corresponding surrounding insulation, said connector assembly comprising means connected to said housing and defining a bore, a corresponding plurality of electrically conducting socket members, insulator means within said bore for supporting said socket members in generally parallel spaced relation, a resilient gland member disposed within said bore and having means defining a corresponding plurality of openings aligned axially with the corresponding said openings within said socket members, each said opening within said gland member being sized for slidably receiving said insulation on the corresponding said power supply lead wire, each of said socket members having means defining an opening for slidably receiving and gripping the exposed end portion of the corresponding said power supply lead wire after said socket member and said gland member are positioned within said bore, means for compressing said gland member in an axial direction after said exposed end portions of said power supply lead wires are slidably inserted into the corresponding said openings within said socket members to produce a fluid-tight seal insulation of each said power supply lead wire and said motor housing, a lightning arrester electrode disposed within said bore and having a plurality of spaced openings aligned axially with said socket members, means connected to each said socket member and projecting through a corresponding said opening within said electrode, each said opening with said electrode having a diameter greater than the diameter of the corresponding said means projecting through said opening and defining therebetween an annular spark gab of predetermined radial size to provide a current discharge path when the voltage on said lead wires exceeds a predetermined value, and means for electrically connecting each socket member to a corresponding lead wire within said housing.

10. A submersible electric motor and electrical connector assembly as defined in claim 9 wherein said lightning arrester electrode comprises a washer-like electrode element, and means for precisely positioning and orientating said electrode element within said bore relative to said socket members.

11. A method of connecting a plurality of individual power supply lead wires to a submersible electric motor including a housing enclosing a stator surrounding a rotor, each lead wire including an electrical conductor surrounding by electrical insulation, comprising the steps of forming a bore within means connected to the motor housing, positioning a plurality of electrical conducting socket members within said bore in generally parallel spaced relation by an electrical insulator member, connecting each socket member to a corresponding lead wire within said motor housing, removing the insulation from the end portion of each lead wire to provide the conductor with an exposed end portion, positioning a resilient gland member within said bore, the gland member having a corresponding plurality of openings, inserting the exposed end portions of said lead wire conductors through the corresponding openings within said gland member and into the corresponding socket members after the socket members are positioned within said bore, and compressing the gland member to form a fluid-tight seal between the insulation on each power supply lead wire and the means defining said bore.

12. A method as defined in claim 11 including the step of forming a corresponding plurality of openings within a generally flat lightning arrester electrode, positioning said electrode within said bore with said openings aligned with said socket members, extending a corresponding plurality of electrical conducting members through said openings within said electrode to the corresponding said socket members, and sizing each said opening within said electrode relative to the corresponding conducting member to define an annular spark gap of predetermined radial size to provide a current discharge path when the voltage on said lead wire exceeds a predetermined valve.

13. In an electric motor including a housing enclosing a stator and a rotor having a shaft supported by bearing means, an improved lightning arrester assembly for power supply lead wires each having an electrical conductor surrounded by insulation, said assembly comprising means connected to said motor housing and defining a bore, at least one electrical conductor element connected to the electrical conductor of one of said power supply lead wires, insulator means disposed within said bore and supporting said conductor element, a lightning arrester electrode disposed within said bore and having at least one opening receiving said conductor element, the size of said opening within said electrode being greater than the size of said conductor element to define a spark gap surrounding said conductor element, said spark gap having a predetermined size to effect a conductive current discharge path when the voltage on said lead wires exceeds a predetermined value for conducting the voltage to said motor housing, seal means forming a liquid-tight enclosure of said conductor element and said lightning arrester within said bore, and means fpr electrically connecting said conductor element to a lead wire within said motor housing.

14. A submersible electric motor and electrical connector assembly as defined in claim 13 wherein said lightning arrester electrode comprises a washer-like electrode element, and means for precisely positioning said orientating said electrode element within said bore relative to said conductor element.

* * * * *

UNITED STATES PATENT OFFICE
CERTIFICATE OF CORRECTION

Patent No. 3,997,232      Dated December 14, 1976

Inventor(s) Louis R. Dunaway

It is certified that error appears in the above-identified patent and that said Letters Patent are hereby corrected as shown below:

Column 1, line 67, "lighting" should be --lightning--.

Column 2, line 44, after "motor" insert --and--.

Column 3, line 30, after "upwardly" insert --facing--.

Column 3, line 33, "keywary" should be --keyway--.

Column 3, line 66, after "80" cancel --and--.

Column 4, line 59, cancel "sockets" and insert --socket end portions--.

Column 5, line 24, "portions" should be --portion--.

Column 6, line 1, "An" should be --As--.

Column 6, line 20, "beeb" should be --been--.

Column 8, line 42, after "seal" insert --between said--.

Column 8, line 52, "gab" should be --gap--.

Column 8, line 67, "surrounding" should be --surrounded--.

Column 10, line 21, after "arrester" insert --electrode--.

Column 10, line 22, "fpr" should be --for--.

Column 10, line 29, "said" (first occurrence) should be --and--.

Signed and Sealed this

Fifteenth Day of March 1977

[SEAL]

Attest:

RUTH C. MASON
*Attesting Officer*

C. MARSHALL DANN
*Commissioner of Patents and Trademarks*